(12) United States Patent
Yanagawa et al.

(10) Patent No.: US 8,824,105 B2
(45) Date of Patent: Sep. 2, 2014

(54) PIVOT BEARING AND MAGNETIC RECORDING APPARATUS USING THE SAME

(75) Inventors: Kouichi Yanagawa, Kanagawa (JP); Hiroshi Nishizawa, Kanagawa (JP); Takashi Shimokawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/876,046

(22) PCT Filed: May 28, 2012

(86) PCT No.: PCT/JP2012/063678
§ 371 (c)(1),
(2), (4) Date: Mar. 26, 2013

(87) PCT Pub. No.: WO2013/145343
PCT Pub. Date: Oct. 3, 2013

(65) Prior Publication Data
US 2014/0002931 A1    Jan. 2, 2014

(30) Foreign Application Priority Data

Mar. 29, 2012  (JP) .................................. 2012-078227

(51) Int. Cl.
*G11B 5/012*  (2006.01)
(52) U.S. Cl.
USPC ....................................................... 360/265.2
(58) Field of Classification Search
CPC ........................................................ G11B 5/39
USPC ....................................................... 360/265.2
See application file for complete search history.

(56) References Cited

U.S. PATENT DOCUMENTS

| | | | | |
|---|---|---|---|---|
| 6,288,878 B1* | 9/2001 | Misso et al. | ............... | 360/264.3 |
| 7,085,108 B1* | 8/2006 | Oveyssi et al. | ............ | 360/265.2 |
| 7,554,771 B2* | 6/2009 | Hanrahan et al. | .......... | 360/265.2 |
| 7,922,418 B2* | 4/2011 | Baker et al. | ................... | 403/372 |

(Continued)

FOREIGN PATENT DOCUMENTS

| | | |
|---|---|---|
| JP | 2001-327118 A | 11/2001 |
| JP | 2002-106554 A | 4/2002 |
| JP | 2011-256967 A | 12/2011 |

OTHER PUBLICATIONS

International Search Report dated Aug. 21, 2012 issued in International Application No. PCT/JP2012/063678 (PCT/ISA/210).

(Continued)

*Primary Examiner* — Mark Blouin
(74) *Attorney, Agent, or Firm* — Sughrue Mion, PLLC (57) ABSTRACT

A pivot bearing 13 includes: a shaft 21; and a plurality of ball bearings 20 which are arranged in an axial direction with respect to the shaft 21 and each of which has an inner ring 27 fixed to the shaft 21 and an outer ring 25 fixed to a fixing hole 18 of an arm 16 via a tolerance ring 12, the pivot bearing being configured to swing around the shaft. The number of balls of each ball bearing 20 and the number of concave portions of the tolerance ring 12, which are configured to press the outer ring 25, are relatively prime to each other. Accordingly, it is possible to inexpensively make the reliable pivot bearing that achieves high precision with a simple structure, and thus a reliable high density magnetic recording apparatus is provided.

14 Claims, 8 Drawing Sheets

(56) References Cited

U.S. PATENT DOCUMENTS

| | | | |
|---|---|---|---|
| 7,957,103 B2* | 6/2011 | Woodhead et al. | 360/265.2 |
| 8,317,425 B2* | 11/2012 | Court et al. | 403/372 |
| 2006/0181811 A1* | 8/2006 | Hanrahan et al. | 360/265.2 |
| 2007/0268630 A1* | 11/2007 | Fisher et al. | 360/265.2 |
| 2007/0291417 A1* | 12/2007 | Woodhead et al. | 360/265.2 |
| 2008/0062572 A1* | 3/2008 | Hanrahan et al. | 360/265.2 |
| 2008/0199254 A1* | 8/2008 | Baker et al. | 403/372 |

OTHER PUBLICATIONS

Written Opinion dated Aug. 21, 2012 issued in International Application No. PCT/JP2012/063678 (PCT/ISA/237).

* cited by examiner

BALLS: 9 PIECES
RING: 8 CONCAVE PORTIONS

PIVOT BEARING AND MAGNETIC RECORDING APPARATUS USING THE SAME

TECHNICAL FIELD

The present invention relates to: a pivot bearing that allows a precise swing motion at low torque or with small variations in torque; and a magnetic recording apparatus using the pivot bearing.

BACKGROUND ART

In a pivot bearing of this type, a plurality of ball bearings are conventionally located axially (in a tandem manner) with respect to a shaft conforming to inner rings of the ball bearings, thus allowing a swing motion around the shaft with high precision and at low torque. Meanwhile, a pivot bearing is often used as a bearing for a swing arm (swing motion) type head access mechanism in a magnetic recording apparatus such as in a hard disk drive (hereinafter denoted by the acronym "HDD") in particular. In an HDD, an areal recording density is continually increased and is now about to reach 1 Tbpsi (1 Tera Bit Per Square Inch) due to increases in linear recording density and track density. Hence, a desire for precision of micro-positioning is also growing, and there is an increasing demand for higher precision of a pivot bearing.

According to Patent Literature 1, an inner ring of one of two bearings included in a pivot bearing is formed at a pivot shaft, thus making it possible to reduce the number of components and torque variations. Moreover, Patent Literature 1 discloses fixation of an arm of an HDD and the pivot bearing via a tolerance ring. Patent Literature 1 further discloses that the tolerance ring is located in a gap between an arm hole and the pivot bearing, and is thus compressed to exert a reaction force so that the pivot bearing can be elastically supported with respect to the arm hole. Furthermore, Patent Literature 2 discloses that when a pivot bearing is fixed in an arm hole via a tolerance ring, protruded portions (projections) of the tolerance ring are plastically deformed, thereby reducing a stress applied to an outer ring of the pivot bearing, reducing the influence associated with deformation of the outer ring, and obtaining a higher removing force. Besides, Patent Literature 2 also discloses that an allowable range of variations in a gap between the arm hole and an outer diameter of the pivot bearing can be increased, and an increase in torque can be prevented in a state where the pivot bearing is mounted.

PRIOR ART REFERENCE

Patent Literature

[Patent Literature 1] JP-A-2002-106554 (see page 4, paragraphs [0024] to [0026], FIG. 5 and FIG. 7)
[Patent Literature 2] US 2008/0199254 A1 (see page 1, paragraphs [0012] to [0014], FIG. 2 and FIG. 9)

SUMMARY OF THE INVENTION

Problems to be Solved by the Invention

However, in the pivot bearing disclosed in Patent Literature 1, rolling grooves through which balls run have to be formed at part of the shaft; hence, it is conceivable that there might be no flexibility in selecting a material in terms of bearing characteristics, and a step for forming the grooves might be different from a normal step for forming a ball bearing, thus causing a reduction in productivity and an increase in price.

Meanwhile, in assembling the pivot bearing by using the tolerance ring as disclosed in Patent Literature 2, a higher contact pressure has to be applied between the tolerance ring and the outer ring of the pivot bearing in order to strengthen fastening of the pivot bearing to the arm hole. Thus, the deformation of the outer ring of the pivot bearing is increased, and rolling grooves for balls are deformed, thereby causing an increase in torque or a reduction in rotational accuracy. This triggers a reduction in access speed or stop position precision in a recording and/or reproducing apparatus such as an HDD, which is a factor contributing to performance degradation in the recording and/or reproducing apparatus.

The present invention has been made to solve the above conventional problems, and enables inexpensive fabrication of a reliable pivot bearing that achieves high precision with a simple structure, thus providing a reliable high density magnetic recording apparatus.

Means for Solving the Problems

To achieve the above object, the present invention provides a pivot bearing comprising: a shaft; and a plurality of ball bearings which are arranged in an axial direction with respect to the shaft and each of which has an inner ring fixed to the shaft and an outer ring fixed to a fixing hole of an arm via a tolerance ring, the pivot bearing being configured to swing around the shaft, wherein the number of balls of each of the ball bearings and the number of concave portions of the tolerance ring, which are configured to press the outer ring, are relatively prime to each other. In this structure, when the outer ring is a simple ring, deformation will occur due to a stress of the tolerance ring, and therefore, the outer ring will be deformed into a polygon whose number of sides is equal to the number of the concave portions of the tolerance ring. A preload is applied to each ball bearing, an inner ring raceway surface and an outer ring raceway surface thereof are brought into contact with the balls, and rigidity of an inner ring inner diameter portion of each of the ball bearings is increased by the shaft inserted and fixed therethrough. Hence, it is conceivable that radial rigidity of the outer ring may be greatly different between a position at which the ball exists and a position at which no ball exists with respect the circumferential direction. In other words, the outer ring exhibits a characteristic that its rigidity changes repeatedly in accordance with the number of the balls with respect to the circumferential direction. Due to these reasons, the outer ring is deformed into a polygon whose number of sides corresponds to the number of external stresses, i.e., the number of the concave portions of the tolerance ring, and the rigidity of the outer ring is changed repeatedly in accordance with the number of the balls. When the number of the concave portions of the tolerance ring is m and the number of the balls is n, deformation of a raceway groove of the outer ring is regarded as deformation of the outer ring itself, and it is conceivable that the outer ring is deformed into a polygon whose number of sides corresponds to the least common multiple of m and n, i.e., L.C.M. (m, n).

Since m and n are relatively prime, the outer ring is deformed into a polygon whose number of sides corresponds to L.C.M.(m, n)=m×n, so that the resulting polygon can be close to an apparent perfect circle, thus making it possible to reduce deformation of the raceway groove of the outer ring and to prevent degradation in characteristics of the pivot bearing.

According to another aspect, the concave portions of the tolerance ring, configured to press the outer ring, are located equidistantly in a circumferential direction. In this aspect, a polygon obtained when the outer ring is deformed as mentioned above can be formed into a regular polygon. As a result, deformation variations can be reduced, thereby making it possible to improve the characteristics of the pivot bearing.

According to still another aspect, the inner ring, outer ring and balls of each of the ball bearings are made of martensite stainless steel. In this aspect, as compared with a case where high-carbon chromium steel such as SUJ2 is used, rust preventing capability is increased, thereby making it possible to eliminate the necessity for application of a rust preventing oil and to reduce contaminants incident to evaporation of the rust preventing oil.

According to yet another aspect, the number of the balls of each of the ball bearings is either 11 or 13. In this aspect, the number of the balls is already a prime number; therefore, except when the number of the concave portions of the tolerance ring is equal to the number of the balls of each of the ball bearings, the number of the balls of each of the ball bearings and the number of the concave portions of the tolerance ring can always be relatively prime, thus making it possible to achieve a higher degree of design flexibility in deciding the number of the concave portions of the tolerance ring.

According to still yet another aspect, the number of the balls of each of the ball bearings is larger than the number of the concave portions of the tolerance ring configured to press the outer ring. In this aspect, when a comparison is made between precision of the tolerance ring formed by common presswork and precision of positioning of the balls in each of the ball bearings, the latter precision is generally higher. Hence, a higher degree of design flexibility can be achieved so as to further facilitate optimization of, for example, the number or shape of the concave portions which is likely to absorb precision degradation or variations in each concave portion caused by springback.

According to another aspect, a swing range allowed by the pivot bearing is set at a mechanical angle of 45° or less, and the number of the balls of each of the ball bearings is eight or more. In order to reduce variations in the location of each component in the rotational direction of the ball bearings, the balls may be located so that the ball pitch of each ball bearing is equal to or less than the mechanical angle. With the use of the ball bearings whose ball pitch is 45° or less or the ball bearings each having the eight or more balls, the relative locations of the balls in the circumferential direction will not be changed in the swing range, and therefore, more stable precision can be achieved.

According to still another aspect, there is provided a magnetic recording apparatus which uses a pivot bearing comprising: a shaft; and a plurality of ball bearings which are arranged in an axial direction with respect to the shaft and each of which has an inner ring fixed to the shaft and an outer ring fixed via a tolerance ring to a fixing hole of an arm having a magnetic head at front end thereof, the pivot bearing being configured to swing around the shaft to allow track access of the magnetic head, wherein the number of balls of each of the ball bearings and the number of concave portions of the tolerance ring, which are configured to press the outer ring, are relatively prime to each other. In this aspect, when the number of the concave portions of the tolerance ring is m and the number of the balls is n as mentioned above, m and n are relatively prime; therefore, the outer ring is deformed into a polygon whose number of sides corresponds to L.C.M.(m, n)=m×n, so that the resulting polygon can be close to an apparent perfect circle, thus making it possible to reduce deformation of a raceway groove of the outer ring and to prevent degradation in characteristics of the pivot bearing.

Hence, the rotational accuracy of the pivot bearing can be maintained at a high level for access of the magnetic head in the magnetic recording apparatus, thus making it possible to improve track positioning accuracy of the high density recording apparatus in which a track density is high, and to fabricate the magnetic recording apparatus that has an advantage in high density recording.

Effect of the Invention

As described above, according to the present invention, the number of the balls of each of the ball bearings and the number of the concave portions of the tolerance ring are relatively prime in the swing motion type pivot bearing in which the outer rings are fixed via the tolerance ring, thus making it possible to reduce deformation of the raceway grooves of the outer rings; hence, the pivot bearing that allows a precise swing motion at low torque or with small variations in torque can be fabricated. Moreover, with the use of this pivot bearing, the magnetic recording apparatus having a higher track density and capable of performing higher density recording can be fabricated.

MODE FOR CARRYING OUT THE INVENTION

Figure 1:
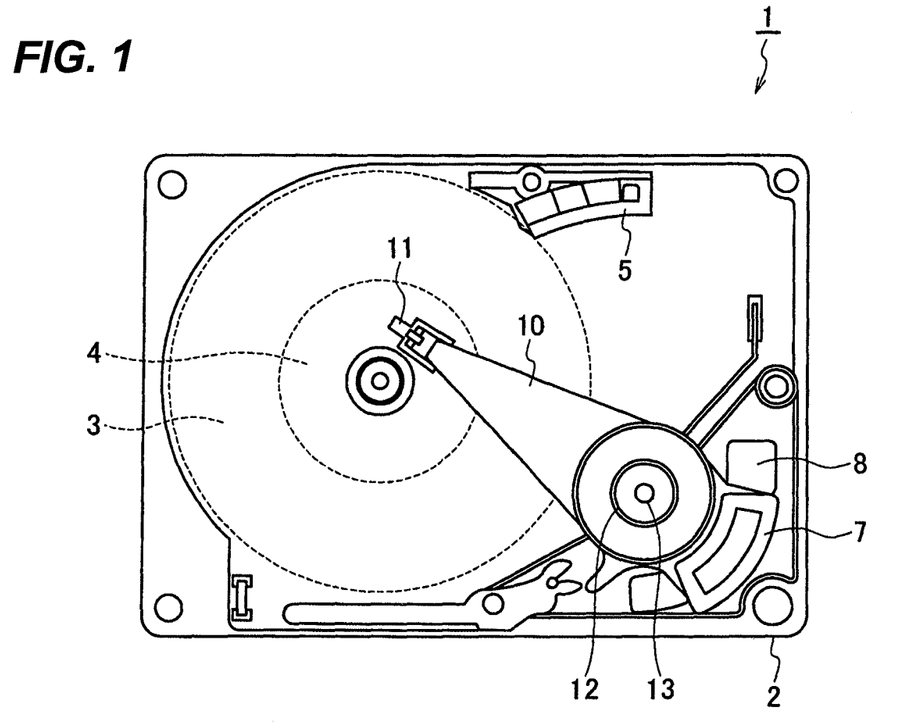
FIG. 1 is a schematic plan view of an HDD according to one embodiment of the present invention.
Figure 2:
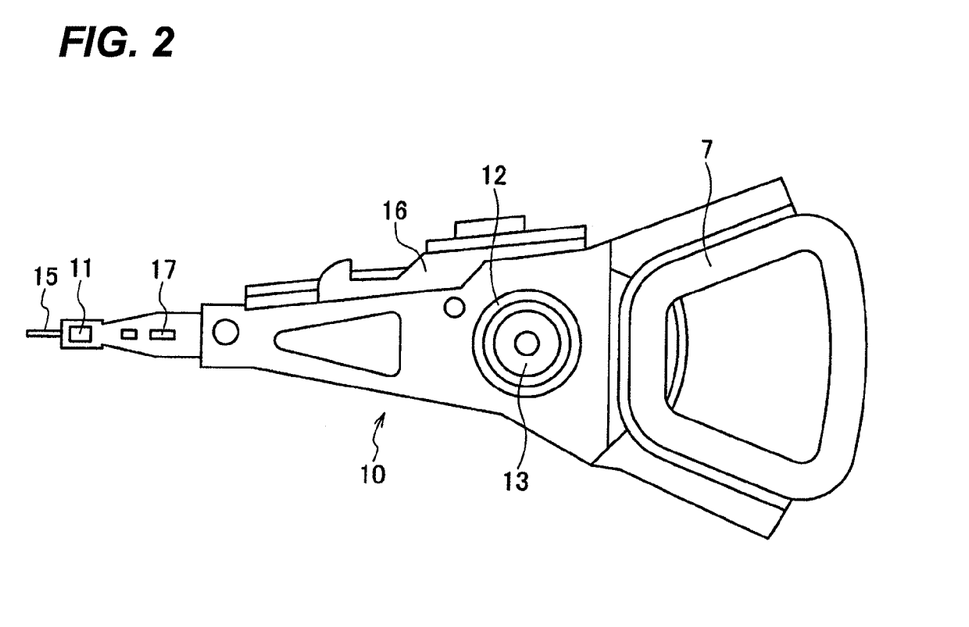
FIG. 2 is a schematic plan view of an HSA of the HDD according to the present embodiment.
Figure 3:
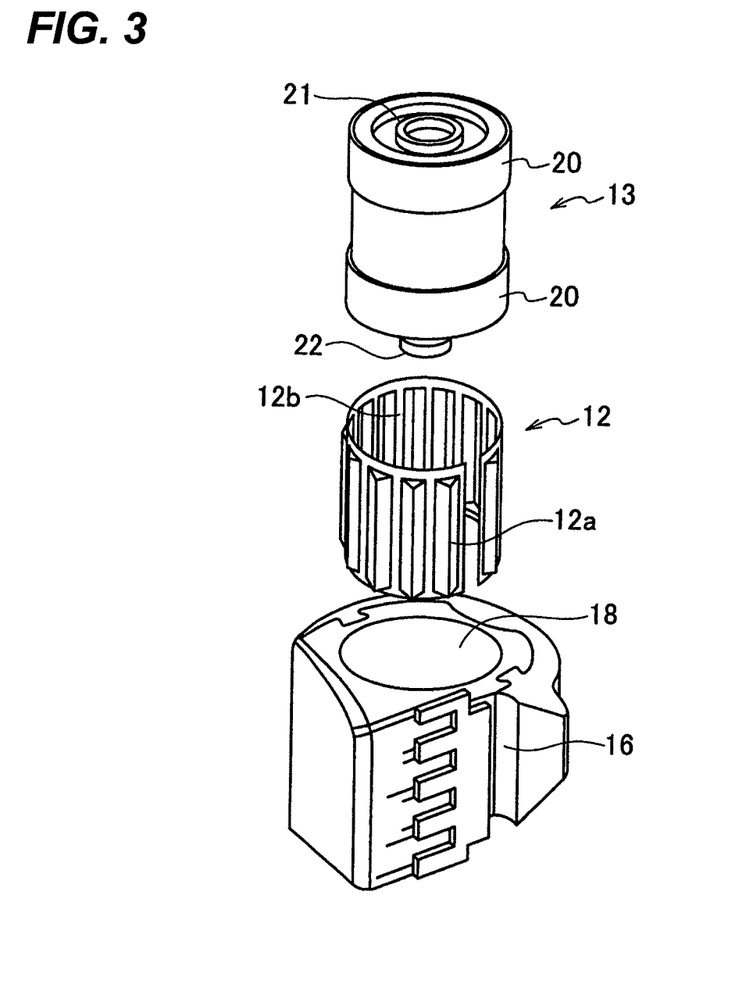
FIG. 3 is a perspective view illustrating a pivot bearing and an arm according to the present embodiment.
Figure 4:
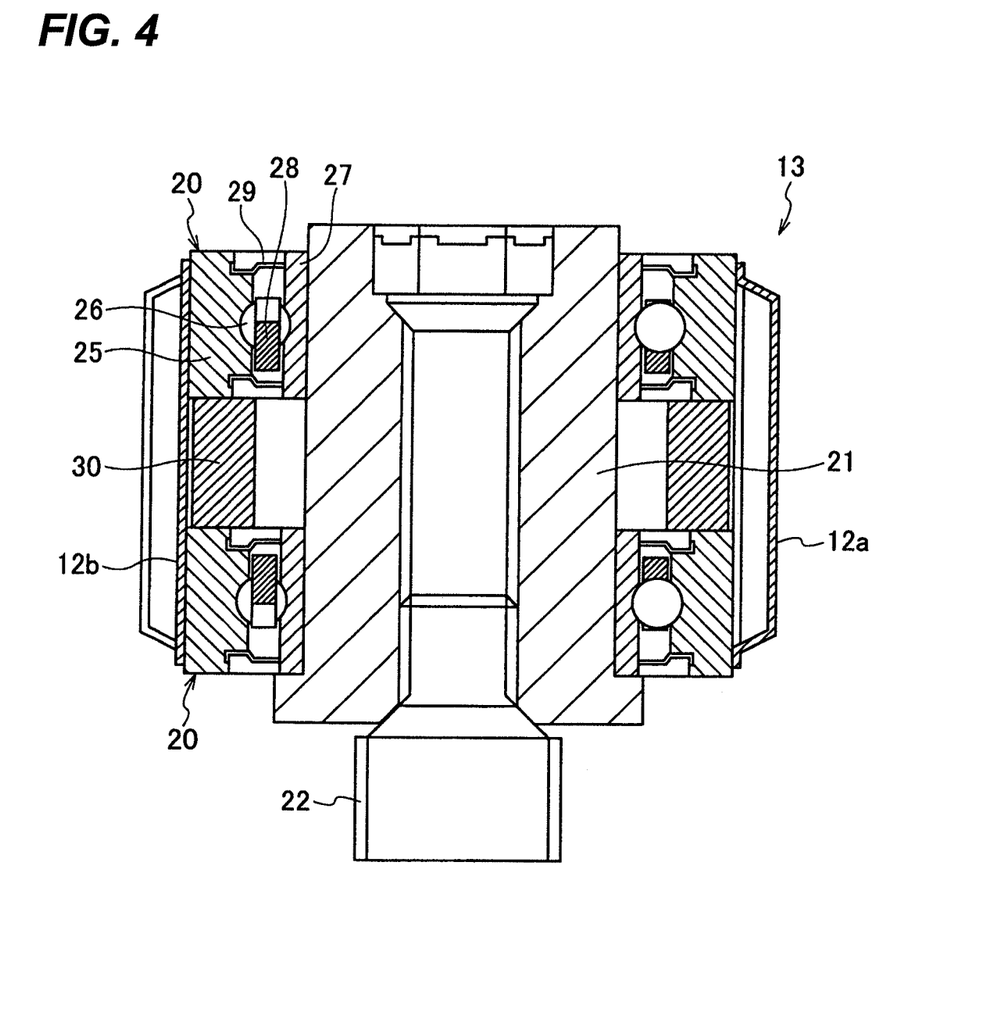
FIG. 4 is a cross-sectional view illustrating the pivot bearing and tolerance ring according to the present embodiment.
Figure 5A:
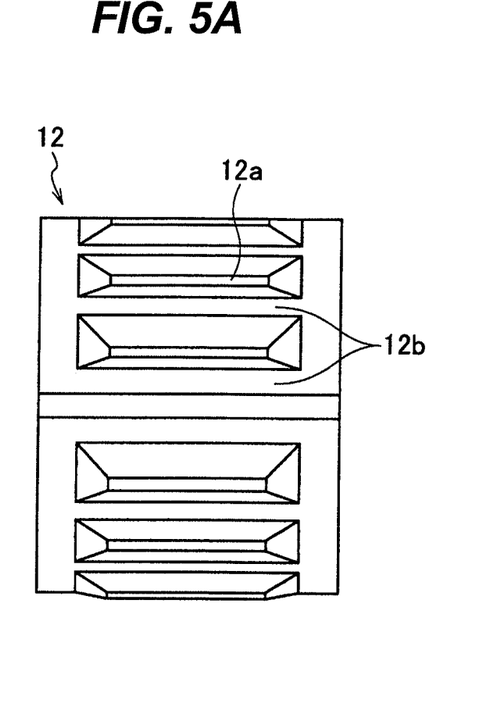
FIG. 5A is a front view of the tolerance ring.
Figure 5B:
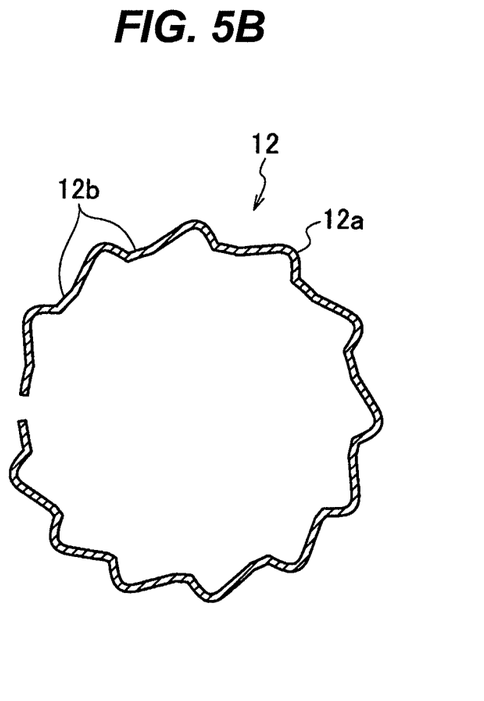
FIG. 5B is a cross-sectional view of the tolerance ring.
Figure 6:
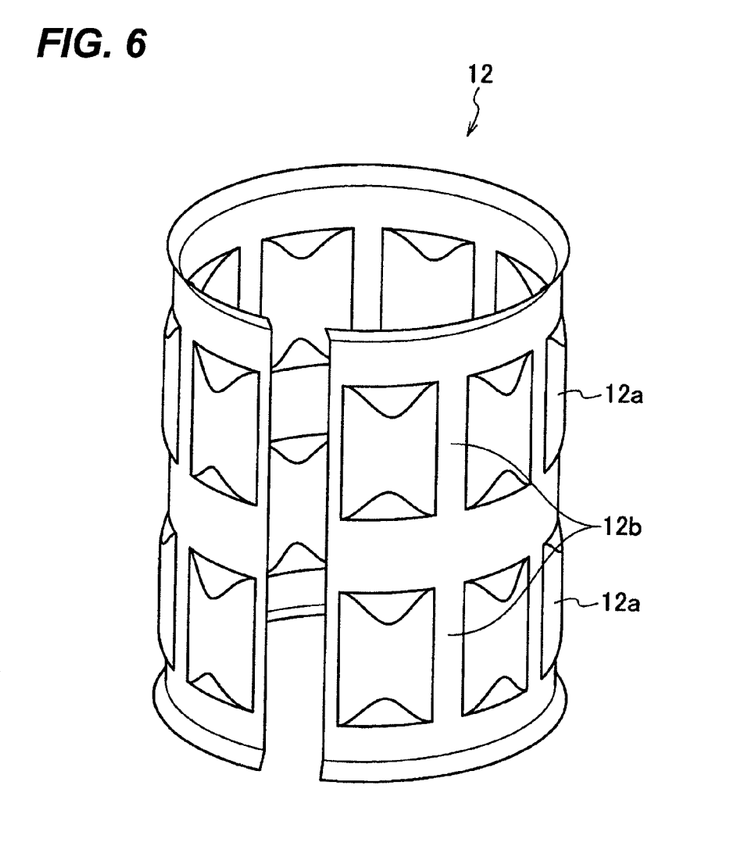
FIG. 6 is a perspective view of another tolerance ring.
Figure 7:
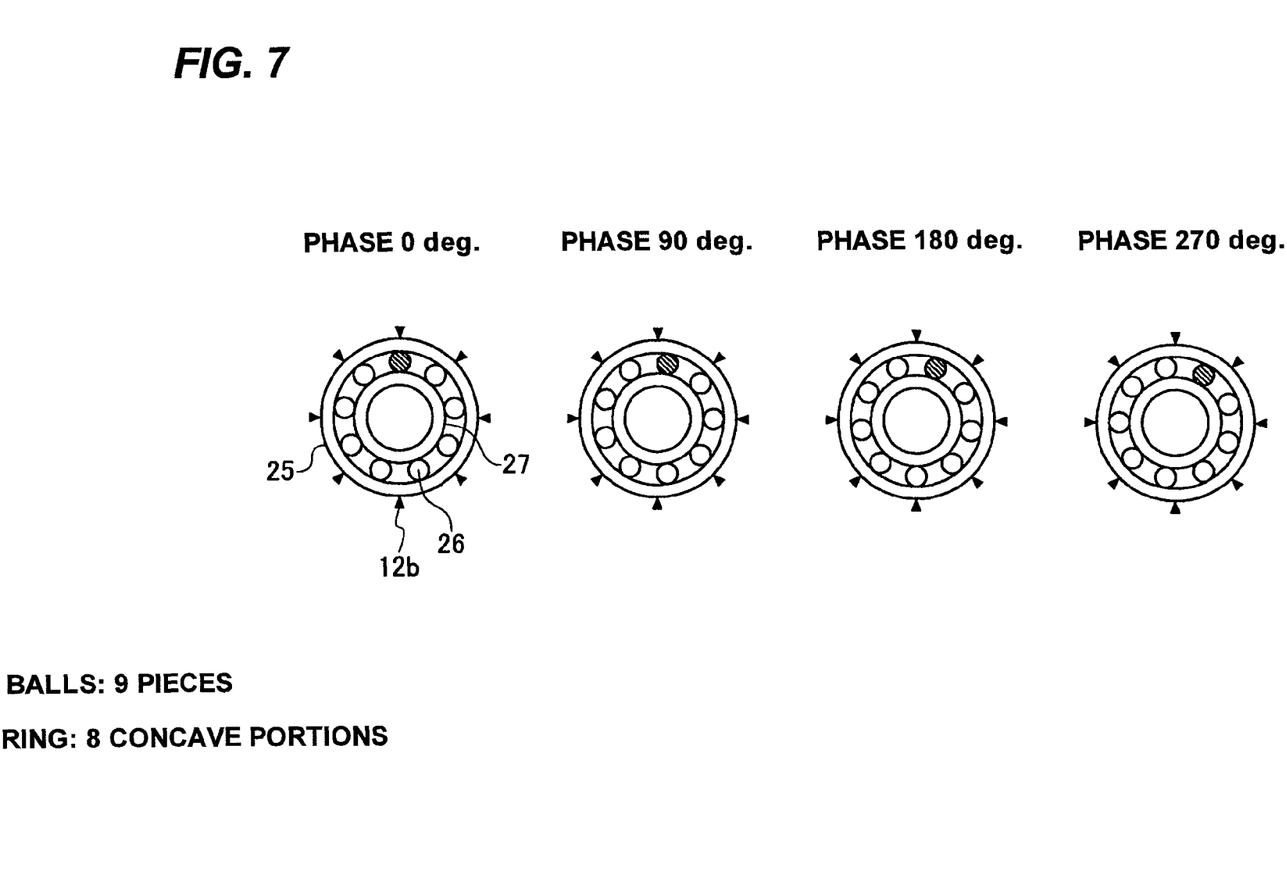
FIG. 7 is a plan view illustrating a relationship between the pivot bearing and the tolerance ring according to one embodiment of the present invention.
Figure 8A:
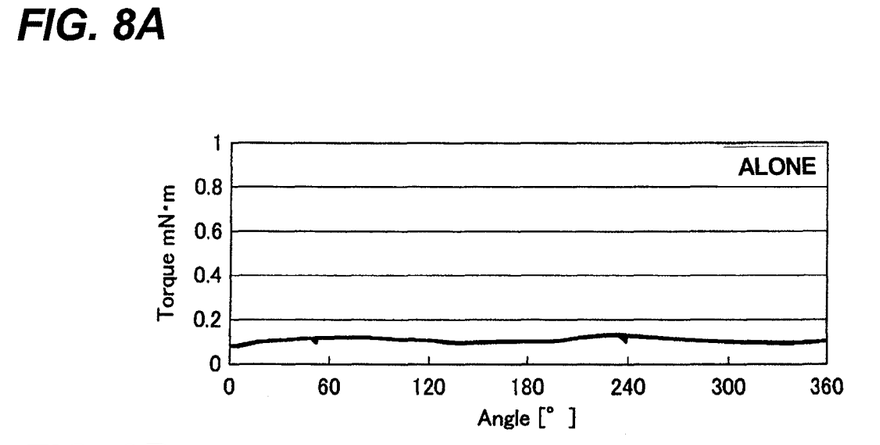
FIGS. 8A to 8C are characteristic graphs illustrating swing torque to verify effects of the pivot bearing according to the present invention.
Figure 8B:
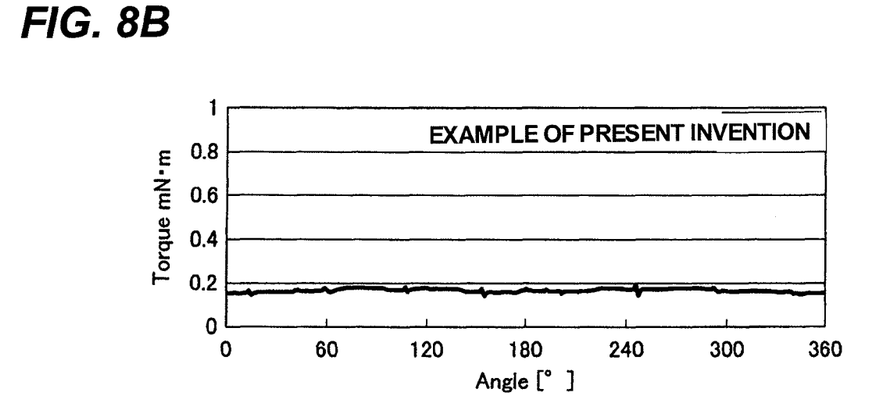
Figure 8C:
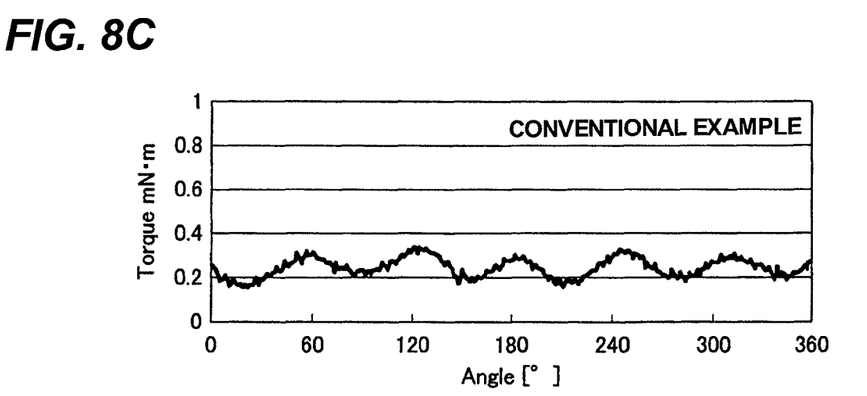

One embodiment of the present invention will be described with reference to the drawings. FIG. 1 is a schematic plan view of an HDD according to one embodiment of the present invention. FIG. 2 is a schematic plan view of an HSA of the HDD according to the present embodiment. FIG. 3 is a perspective view illustrating a pivot bearing and an arm according to the present embodiment. FIG. 4 is a cross-sectional view illustrating the pivot bearing and tolerance ring according to the present embodiment. FIG. 5A is a front view of the tolerance ring. FIG. 5B is a cross-sectional view of the tolerance ring. FIG. 6 is a perspective view of another tolerance ring. FIG. 7 is a schematic diagram describing a relationship between the bearing and the tolerance ring according to the present embodiment. FIGS. 8A to 8C show characteristic graphs illustrating swing torque of the pivot bearing according to the present invention.

The general outlines of the HDD according to the present embodiment are as follows. The HDD has an areal recording density of about 750 Gbpsi (Giga bit per square inch) in a 2.5-inch perpendicular magnetic recording method, and is equipped with two disks to have a storage capacity of 1 TB (Tera Byte). Hereinafter, a structure of the HDD will first be described with reference to FIGS. 1 and 2.

A magnetic disk 3 serving as a magnetic recording medium is fixed to an aluminum base plate 2 via a not-illustrated spindle and hub which are provided at a spindle motor 4, so that the magnetic disk 3 is rotatably supported. The magnetic disk 3 is formed by depositing layers such as an under layer, a soft magnetic under layer (SUL), an Ru intermediate layer, a recording layer and a DLC layer over a glass base material (substrate) by sputtering. Moreover, a lubricant consisting mainly of perfluoropolyether (PFPE) is applied as a fluorochemical oil to a surface of the uppermost layer of the magnetic disk 3. As the recording layer, a Co—Cr—Pt granular film is used, and a grain boundary is separated by $SiO_2$.

The HSA (Head Stack Assembly) 10 is provided at its one end with a magnetic head 11, and is provided at its other end with a coil 7 included in a VCM (Voice Coil Motor) for moving the magnetic head 11 in a track direction of the magnetic disk 3 (i.e., a radial direction of the magnetic disk 3). At a portion of the HSA 10 adjacent to the magnetic head 11, a gimbal spring assembly (which is called an "HGA [Head Gimbal Assembly]") for holding the magnetic head 11 is fixed to an arm 16 by swaging. Furthermore, at a front end of the magnetic head 11, there is a region called a tab 15, and the tab 15 cooperates with a ramp 5 attached to the base plate 2, thereby allowing the magnetic head 11 to be loaded/unloaded on/from the magnetic disk 3. The magnetic head 11 used in this embodiment is mounted on a femto slider and is supported by a high-rigidity suspension; in addition, its flying height is controlled by using thermal expansion.

The HSA 10 is formed so as to be swung around a pivot bearing 13 provided at a center region of the HSA 10 and serving as a rotation center. A magnet 8 is located below the coil 7 of the VCM and a magnetic circuit is formed by a not-illustrated yoke, so that due to an electric current supplied to the coil 7, torque is generated by Fleming's left-hand rule, thus allowing the HSA 10 to swing around the pivot bearing 13 serving as the rotation center, and enabling track access.

As illustrated in FIG. 3, in the HSA 10, the pivot bearing 13 is fixed in a fixing hole 18 of the arm 16 (also referred to as an "E-block"), made of an aluminum alloy and serving as a base of the HSA 10, via a tolerance ring 12. The fixation via the tolerance ring 12 is suitable for execution of rework such as removal of the HSA 10 from an HDA (Head Disk Assembly) for replacement or correction in the event of failure in the magnetic head 11 due to an ESD (Electro Static Discharge) or the like.

In recent years, the density of an HDD has been further increased, and the performance of the magnetic head 11 has been further enhanced accordingly; however, there has been a tendency to complicate a film structure for obtaining a higher MR ratio and to reduce a withstanding ESD voltage. Further, since the costs of components have also been increased, workability of HGA rework is preferably improved, and therefore, workability for the fixation via the tolerance ring 12 is expected to improve compared with conventional bonding, press-fitting and the like.

As illustrated in FIGS. 3 and 4, the pivot bearing 13 includes: a shaft 21; and a plurality of ball bearings 20 (a pair of ball bearings 20 in the present embodiment) arranged in an axial direction with respect to the shaft 21, with a spacer 30 interposed therebetween. The shaft 21 is provided with a screw 22 for fixing the pivot bearing 13 to the base plate 2. The ball bearings 20 each include: an inner ring 27 fixed to the shaft 21; an outer ring 25 fixed to the fixing hole 18 of the arm 16 via the tolerance ring 12; a plurality of balls 26 located between the inner ring 27 and the outer ring 25; a retainer 28 for holding the balls 26; and a seal member 29. The ball bearings 20 are lubricated with grease.

Note that in the present embodiment, the inner rings 27, the outer rings 25 and the balls 26 are each made of martensite stainless steel. Thus, as compared with a case where high-carbon chromium steel such as SUJ2 is used, rust preventing capability is increased, thereby making it possible to eliminate the necessity for application of a rust preventing oil and to reduce contaminants incident to evaporation of the rust preventing oil.

Furthermore, as illustrated in FIG. 5, the tolerance ring 12 is provided by rolling a steel plate made of a spring material such as SUS304CSP into a tubular shape. At an axial intermediate portion of the tolerance ring 12, a plurality of convex portions 12a protruded radially outward are located equidistantly in a circumferential direction. Accordingly, a plurality of concave portions 12b adapted to press the outer rings 25 are located between the plurality of convex portions 12a so as to be equidistant in the circumferential direction.

Note that as illustrated in FIG. 6, the tolerance ring 12 may be formed so that the convex portions 12a are axially divided and the concave portions 12b located between the divided convex portions 12a press the outer ring 25 of each ball bearing 20.

Moreover, in the present embodiment, each concave portion located between the adjacent convex portions 12a so as to press the outer ring 25 is intended to provide a contact surface that abuts against the outer ring 25; thus, each convex portion 12a of the tolerance ring 12 is deformed between the pivot bearing 13 and the arm 16, thereby applying a pressing force to the contact surface from the convex portions 12a located on both sides thereof. Accordingly, in the present embodiment, the number of the concave portions (i.e., the number of the contact surfaces) and the number of the convex portions 12a are substantially equal to each other.

In the present embodiment, the number of the balls of each ball bearing 20 and the number of the concave portions of the tolerance ring 12, which press the outer ring 25, are set so as to be relatively prime. When the outer ring 25 is a simple ring, the outer ring 25 will be deformed due to a stress of the tolerance ring 12, and therefore, the outer ring 25 will be deformed into a polygon whose number of sides is equal to the number of the concave portions of the tolerance ring 12. A preload is applied to each ball bearing 20, an inner ring raceway surface and an outer ring raceway surface thereof are brought into contact with the balls 26, and rigidity of an inner ring inner diameter portion of each ball bearing 20 is increased by the shaft 21 inserted and fixed therethrough. Hence, it is conceivable that radial rigidity of the outer ring 25 may be greatly different between a position at which the ball 26 exists and a position at which no ball 26 exists with respect the circumferential direction. In other words, the outer ring 25 exhibits a characteristic that its rigidity changes repeatedly in accordance with the number of the balls 26 with respect to the circumferential direction. Due to these reasons, the outer ring 25 is deformed into a polygon whose number of sides corresponds to the number of external stresses, i.e., the number of the concave portions of the tolerance ring 12, and the rigidity of the outer ring 25 is changed repeatedly in accordance with the number of the balls 26. When the number of the concave portions of the tolerance ring 12 is m and the number of the balls 26 is n, deformation of a raceway groove of the outer ring 25 is regarded as deformation of the outer ring 25 itself, and it is conceivable that the outer ring 25 is deformed into a polygon whose number of sides corresponds to the least common multiple of m and n, i.e., L.C.M.(m, n).

Since m and n are relatively prime, the outer ring 25 is deformed into a polygon whose number of sides corresponds to L.C.M.(m, n)=m×n, so that the resulting polygon can be close to an apparent perfect circle, thus making it possible to reduce deformation of the raceway groove of the outer ring 25 and to achieve lower torque of the pivot bearing 13.

For example, as illustrated in FIG. 7, when the ball 26 is located at a position corresponding to that of the concave portion of the tolerance ring 12, the concave portion of the tolerance ring 12, the outer ring 25, the ball 26, the inner ring 27 and the shaft 21 are substantially radially aligned; therefore, the rigidity of the outer ring is apparently maximized, and degradation in roundness can be reduced. Conversely, the rigidity of the outer ring is minimized when the concave portion of the tolerance ring 12 is located at a position corresponding to that of a midpoint between the balls 26. As illustrated in FIG. 7, when m is 8 and n is 9, i.e., when m and n are relatively prime, the outer ring 25 is deformed into a polygon whose number of sides corresponds to L.C.M.=72, and apparent roundness of the resulting outer ring 25 can be improved.

In particular, the concave portions 12b of the tolerance ring 12 are located equidistantly in the circumferential direction; thus, a polygon obtained when the outer ring 25 is deformed can be formed into a regular polygon, and deformation variations are reduced.

It should be noted that the number of the balls of each ball bearing 20 can be set at any number as long as the above-described relationship is established; for example, the number of the balls of each ball bearing used for the HDD is actually between 8 and 13. Furthermore, the number of the concave portions of the tolerance ring 12 can also be set at any number; for example, the number of the concave portions of the tolerance ring 12 used for the HDD is actually between 7 and 15.

Accordingly, when the number n of the balls is 8, for example, the number m of the concave portions of the tolerance ring 12 is 7, 9, 11, 13 or 15, for example, in order to establish the above-described relationship. Furthermore, when the number n of the balls is either 11 or 13, the number of the balls is already a prime number; hence, except when the number of the concave portions of the tolerance ring 12 is equal to the number of the balls, the number of the concave portions of the tolerance ring 12 and the number of the balls can always be relatively prime, thus making it possible to achieve a higher degree of design flexibility in deciding the number of the concave portions of the tolerance ring 12. Specifically, when the number n of the balls is 11, the number m of the concave portions may be 7, 8, 9, 10, 12, 13, 14 or 15, for example. Alternatively, when the number n of the balls is 13, the number m of the concave portions may be 7, 8, 9, 10, 11, 12, 14 or 15, for example.

When a comparison is made between precision of the tolerance ring 12 formed by common presswork and precision of positioning of the balls 26 in each ball bearing 20, the latter precision is generally higher. Therefore, the number n of the balls is more preferably larger than the number m of the concave portions of the tolerance ring 12 so that design can be performed to provide, for example, the optimal number or shape of the concave portions which is likely to absorb precision degradation or variations in each concave portion caused by springback.

Furthermore, in the present embodiment, a swing range allowed by the pivot bearing 13 is set at a mechanical angle of 45° or less, and in order to reduce variations in the location of each component in the rotational direction of the ball bearings 20, the balls are located so that the ball pitch of each ball bearing 20 is equal to or less than the mechanical angle. In other words, with the use of the ball bearings each having the eight or more balls, the relative locations of the balls 26 in the circumferential direction will not be changed in the swing range, and therefore, more stable precision can be achieved, thus making it possible to improve reliability of a resulting magnetic recording apparatus.

(Torque Test)

Next, a test for verifying the effects of the present invention will be described with reference to FIGS. 7 and 8A to 8C. In this test, a pivot bearing such as one illustrated in FIG. 7, in which the number n of the balls is 8 and the number m of the concave portions of the tolerance ring 12 is 9, was used as an example of the present invention, while a pivot bearing in which the number n of the balls is 8 and the number m of the concave portions of the tolerance ring 12 is 8 was used as a conventional example. Torque generated when an arm was swung under the same conditions was measured in each example. Further, the pivot bearing 13 of the example of the present invention prior to attachment of the tolerance ring 12 thereto was used singly, and torque measurement results obtained when an arm was swung around this pivot bearing 13 under the same conditions are illustrated in FIG. 8A.

As illustrated in FIG. 8B, in the example of the present invention, there are no significant variations in the torque although the torque obtained in this example is larger than the torque obtained in the case of FIG. 8A in which the pivot bearing 13 was used singly. Meanwhile, it is found that as illustrated in FIG. 8C, variations in the torque are significant in the conventional example. Consequently, it is verified that torque variations are reduced when the number of the balls of each ball bearing 20 and the number of the concave portions of the tolerance ring 12 are relatively prime.

The present invention is not limited to the above-described embodiment, but alterations, modifications may be made as appropriate.

For example, in the present embodiment, the tolerance ring 12 is adapted to directly press the outer ring 25 of each ball bearing 20; however, when a sleeve having a thin thickness that allows the tolerance ring 12 to exert a pressing force on the outer rings 25 is used, the present invention may also be applied to a pivot bearing of a type in which the outer rings 25 are fixed to the sleeve.

Moreover, in the present embodiment, the convex portions 12a of the tolerance ring 12 are protruded radially outward in view of assembly properties; however, the convex portions 12a may be protruded radially inward, and peaks of the convex portions may be provided as the concave portions 12b of the tolerance ring 12.

The present invention is based on Japanese Patent Application No. 2012-078227 filed on Mar. 29, 2012, the contents of which are hereby incorporated by reference.

Description of the Reference Characters

1 HDD
2 base plate
3 disk
4 spindle motor
5 ramp
12 tolerance ring
12a convex portion
12b concave portion
13 pivot bearing
16 arm
18 fixing hole
20 ball bearing 21 shaft
25 outer ring
26 ball
27 inner ring

The invention claimed is:

1. A pivot bearing (13) which is disposed in a fixing hole (18) of an arm (16) via a tolerance ring (12), comprising:
   a shaft (21); and
   a plurality of ball bearings (20) arranged in an axial direction with respect to the shaft, each of the ball bearings (20) comprising:
   an inner ring (27) fixed to the shaft (21), the inner ring (27) having a raceway groove;
   an outer ring (25) fixed to the arm (16) via the tolerance ring (12), the outer ring (25) having a raceway groove opposed to the raceway groove of the inner ring (27); and
   a plurality of balls (26) provided between the raceway groove of the inner ring (27) and the raceway groove of the outer ring (25),
   wherein, with respect to each of the ball bearings, the number of balls (26) and the number of concave portions (12b) of the tolerance ring (12), which are configured to directly press the outer ring (25), are relatively prime to each other.

2. The pivot bearing of claim 1, wherein the concave portions of the tolerance ring, which are configured to press the outer ring, are located equidistantly in a circumferential direction.

3. The pivot bearing of claim 1, wherein the inner ring and the outer ring each of the ball bearings are made of martensite stainless steel.

4. The pivot bearing of claim 1, wherein the number of the balls of each of the ball bearings is either 11 or 13.

5. The pivot bearing of claim 1, wherein the number of the balls of each of the ball bearings is larger than the number of the concave portions of the tolerance ring, which are configured to press the outer ring.

6. The pivot bearing of claim 1, wherein a swing range allowed by the pivot bearing is set at a mechanical angle of 45° or less, and the number of the balls of each of the ball bearings is eight or more.

7. A magnetic recording apparatus comprising:
   a head stack assembly (10) comprising:
      a magnetic head (11) at a front end of the head stack assembly; and
      an arm (16) having a fixing hole (18) therein;
   a tolerance ring (12) disposed in the fixing hole (18); and
   a pivot bearing (13) which is disposed in the fixing hole (18) via the tolerance ring (12), the pivot bearing comprising:
   a shaft (12); and
   a plurality of ball bearings (20) arranged in an axial direction with respect to the shaft, each of the ball bearings (20) comprising:
   an inner ring (27) fixed to the shaft (21), the inner ring (27) having a raceway groove;
   an outer ring (25) fixed to the arm (16) via the tolerance ring (12), the outer ring (25) having a raceway groove opposed to the raceway groove of the inner ring (27); and
   a plurality of balls (26) provided between the raceway groove of the inner ring (27) and the raceway groove of the outer ring (25),
   wherein the head stack assembly (10) is configured to swing around the pivot bearing, and
   wherein, with respect to each of the ball bearings, the number of balls (26) and the number of concave portions (12b) of the tolerance ring (12), which are configured to directly press the outer ring (25), are relatively prime to each other.

8. The pivot bearing (13) according to claim 4, wherein the number of the balls of each of the ball bearings is larger than the number of the concave portions of the tolerance ring, which are configured to press the outer ring.

9. The pivot bearing (13) according to claim 4, wherein a swing range allowed by the pivot bearing is set at a mechanical angle of 45° or less, and the number of the balls of each of the ball bearings is eight or more.

10. The magnetic recording apparatus according to claim 7, wherein the number of the balls of each of the ball bearings is larger than the number of the concave portions of the tolerance ring, which are configured to press the outer ring.

11. The pivot bearing (13) according to claim 1, wherein the number of the balls of each of the ball bearings is 8 or more but 11 or less.

12. The magnetic recording apparatus according to claim 7, wherein the number of the balls of each of the ball bearings is 8 or more but 11 or less.

13. The pivot bearing (13) according to claim 1, wherein, in each of the ball bearings, the outer ring is deformed into a polygon whose number of sides corresponds to the least common multiple of the number of the concave portions of the tolerance ring and the number of the balls.

14. The magnetic recording apparatus according to claim 7, wherein, in each of the ball bearings, the outer ring is deformed into a polygon whose number of sides corresponds to the least common multiple of the number of the concave portions of the tolerance ring and the number of the balls.

* * * * *